(12) United States Patent
Boyer et al.

(10) Patent No.: US 9,027,578 B2
(45) Date of Patent: May 12, 2015

(54) WATER DIVERTER VALVE AND RELATED DISHWASHER

(75) Inventors: Joel Charles Boyer, Louisville, KY (US); James Lee Armstrong, Louisville, KY (US); Satish Kumar Raju Buddharaju, Louisville, KY (US)

(73) Assignee: General Electric Company, Schenectady, NY (US)

( * ) Notice: Subject to any disclaimer, the term of this patent is extended or adjusted under 35 U.S.C. 154(b) by 1035 days.

(21) Appl. No.: 13/093,316

(22) Filed: Apr. 25, 2011

(65) Prior Publication Data

US 2012/0266924 A1    Oct. 25, 2012

(51) Int. Cl.
*A47L 15/42* (2006.01)
*F16K 11/074* (2006.01)

(52) U.S. Cl.
CPC ........... *A47L 15/4221* (2013.01); *F16K 11/074* (2013.01)

(58) Field of Classification Search
CPC .......................... F16K 11/074; A47L 15/4221
USPC ........... 134/56 D, 57 D, 58 D, 144, 148, 151, 134/172, 198, 199, 200
See application file for complete search history.

(56) References Cited

U.S. PATENT DOCUMENTS

| | | | |
|---|---|---|---|
| 5,449,011 A * | 9/1995 | Jacobus et al. | 134/176 |
| 5,577,665 A * | 11/1996 | Chang | 239/256 |
| 5,579,789 A * | 12/1996 | Spiegel | 134/104.1 |
| 5,899,433 A | 5/1999 | Kim et al. | |
| 6,705,330 B1 | 3/2004 | Favret | |
| 7,100,623 B2 | 9/2006 | Assmann et al. | |
| 7,237,563 B2 | 7/2007 | Han et al. | |
| 7,337,790 B2 | 3/2008 | Ha | |
| 7,467,636 B2 | 12/2008 | Welch | |
| 7,614,409 B2 | 11/2009 | Han et al. | |
| 7,644,718 B2 | 1/2010 | Jeong et al. | |
| 2004/0103926 A1 | 6/2004 | Ha | |
| 2004/0173249 A1 | 9/2004 | Assman et al. | |
| 2005/0011544 A1 * | 1/2005 | Rosenbauer et al. | 134/57 D |
| 2005/0022849 A1 | 2/2005 | Park et al. | |
| 2005/0150529 A1 * | 7/2005 | Vanderroest et al. | 134/135 |
| 2006/0054198 A1 * | 3/2006 | Choi | 134/56 D |
| 2007/0119488 A1 | 5/2007 | Kwon | |
| 2008/0169026 A1 | 7/2008 | Sanchez | |
| 2009/0139553 A1 | 6/2009 | Park | |
| 2009/0159103 A1 * | 6/2009 | Gillum et al. | 134/98.1 |
| 2010/0043826 A1 * | 2/2010 | Bertsch et al. | 134/18 |

* cited by examiner

*Primary Examiner* — Michael Barr
*Assistant Examiner* — Benjamin L Osterhout
(74) *Attorney, Agent, or Firm* — Dority & Manning, P.A.

(57) ABSTRACT

A gravity and flow operated diverter valve diverts liquid flow from one source to either of two output destinations. The valve includes a housing, an inlet opening, a first outlet opening and a second outlet opening. A valve member is located coaxially in the housing interior, the valve member having at least one flow path extending axially therethough, an exterior edge of the valve member and an interior surface of the side wall having a cooperating cam follower structure defining a cyclic path, the path having at least two no flow positions in which the valve member is spaced from the upper wall, and at least two flow positions in which the flow path in the disc selectively allows communication with one or both of the first and second outlet openings, the cyclic path arranged so that on successive liquid flows into the inlet opening the valve member cycles between the at least two flow positions to selectively direct flow out of one or both of the first and second outlet openings. Related dishwasher designs are also disclosed.

14 Claims, 7 Drawing Sheets

WATER DIVERTER VALVE AND RELATED DISHWASHER

FIELD OF THE INVENTION

The present disclosure relates generally to water diverter valves which can be used in a dishwasher.

BACKGROUND OF THE INVENTION

Dishwashers of various types have been proposed wherein items are placed in a wash chamber which is filled and emptied according to desired wash sequences. Recently, dishwasher manufacturers have focused even more on efficiency in implementing new designs. Thus, an amount of electricity, an amount of detergent, and an amount of water used are all monitored in an attempt to provide efficient and environmentally sensitive machines.

Many dishwashers have more than one outlet within them for spraying water within the wash chamber. For example, dishwashers typically have an upper rack and a lower dish rack. Such dishwashers may have a multiple rotating spray arms located at a lower level, a midlevel (between dish racks), and an upper level that spray during a wash or rinse cycle. Some dishwashers have two such sprayers and some have more.

To reduce the amount of water used in such multiple sprayer dishwashers, it is desirable to alternate spraying between the multiple spray arm assemblies. Doing so requires a smaller amount of water in the wash chamber because only half of the spray system need be actively filled with water at a time. Conventional devices accomplish such alternation with solenoid valves to divert water from one spray assembly or the other. This adds to cost and complexity of the device. Other devices accomplish such switching with a pump driven column of water moving a floating ball or other diverter element. However, such solution requires extra water and has higher pumping requirements.

Accordingly, other designs for alternating water flow between multiple outlets within a wash chamber and related dishwashers including those addressing one or more drawbacks of conventional devices and dishwashers would be welcome.

BRIEF DESCRIPTION OF THE INVENTION

Aspects and advantages of the invention will be set forth in part in the following description, or may be obvious from the description, or may be learned through practice of the invention.

According to certain aspects of the present disclosure, a gravity and flow operated diverter valve for diverting liquid flow from one source to either of two output destinations includes a housing defining a base wall, an upper wall, a central axis extending between the base wall and the upper wall, a side wall connecting the base wall and the upper wall spaced from the central axis, an inlet opening through the base wall, a first outlet opening and a second outlet opening through the upper wall, the base wall, upper wall and side wall defining a housing interior therein, the housing operable in a configuration with the base wall arranged vertically beneath the upper wall. A valve member is located coaxially in the housing interior, the valve member having at least one flow path extending axially therethough, an exterior edge of the valve member and an interior surface of the side wall having a cooperating cam follower structure defining a cyclic path, the path having at least two no flow positions in which the valve member is spaced from the upper wall, and at least two flow positions in which the flow path in the disc selectively allows communication with one or both of the first and second outlet openings, the cyclic path arranged so that on successive liquid flows into the inlet opening the valve member cycles between the at least two flow positions to selectively direct flow out of one or both of the first and second outlet openings. Various options and modifications are possible.

According to certain other aspects of the disclosure, a dishwasher includes a cabinet; a wash chamber within the cabinet; a first spray device for spraying liquid into the wash chamber; a second spray device for spraying liquid into the wash chamber; and a circulation pump assembly for pumping water from a sump area of wash chamber to either the first spray device or the second spray device. A valve includes a housing defining a base wall, an upper wall, a central axis extending between the base wall and the upper wall, a side wall connecting the base wall and the upper wall spaced from the central axis, an inlet opening through the base wall, a first outlet opening and a second outlet opening through the upper wall, the base wall, upper wall and side wall defining a housing interior therein, the housing operable in a configuration with the base wall arranged vertically beneath the upper wall. A valve member is located coaxially in the housing interior, the valve member having at least one flow path extending axially therethough, an exterior edge of the valve member and an interior surface of the side wall having a cooperating cam follower structure defining a cyclic path, the path having at least two no flow positions in which the valve member is spaced from the upper wall, and at least two flow positions in which the flow path in the disc selectively allows communication with one or both of the first and second outlet openings, the cyclic path arranged so that on successive liquid flows into the inlet opening the valve member cycles between the at least two flow positions to selectively direct flow out of one or both of the first and second outlet openings. Again, various options and modifications are possible.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
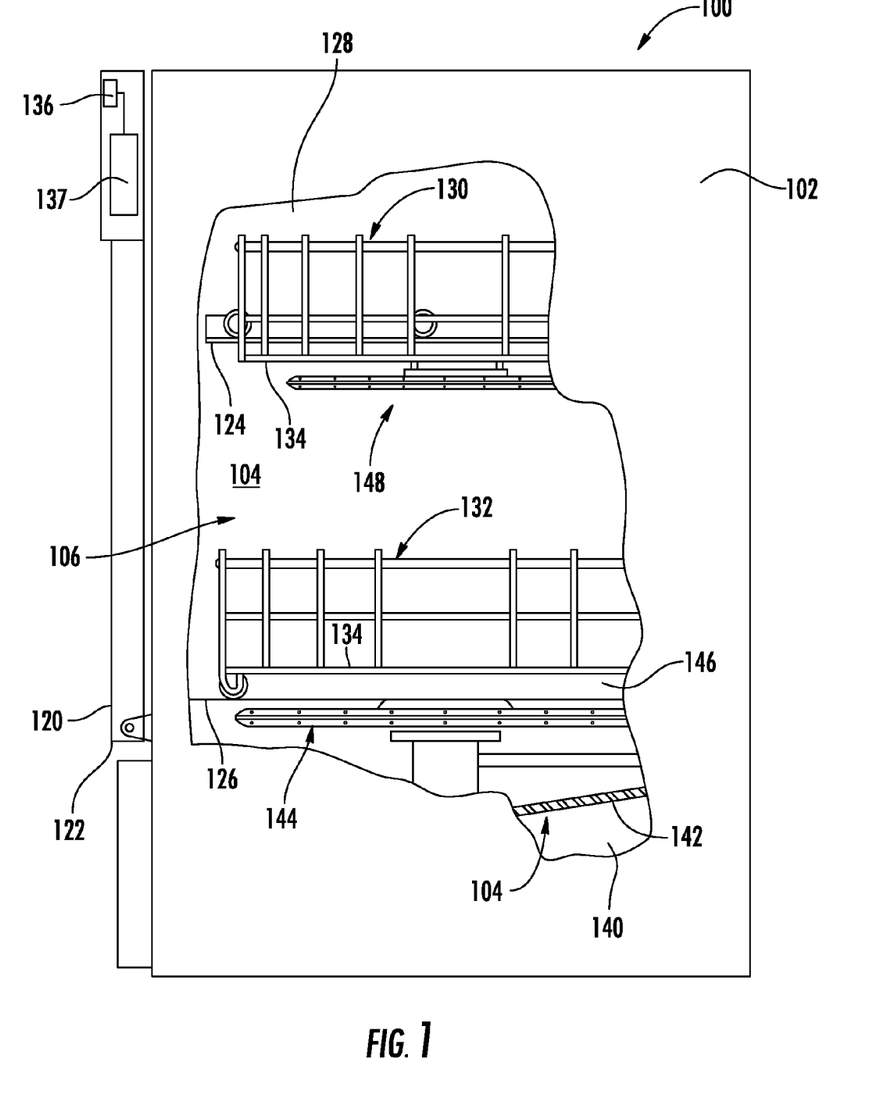
FIG. 1 provides a side partial cut-away view of an exemplary dishwasher that may be configured in accordance with aspects of the invention.

As discussed in greater detail below, embodiments of the present disclosure relate to a flow sensing float device that can be used with a dishwasher. FIG. 1 depicts an exemplary domestic dishwasher 100 that may be configured in accordance with aspects of the disclosure. For the particular embodiment of FIG. 1, the dishwasher 100 includes a cabinet 102 having a tub 104 therein that defines a wash chamber 106. The tub 104 includes a front opening (not shown in FIG. 1) and a door 120 hinged at its bottom 122 for movement between a normally closed vertical position (shown in FIG. 1) wherein the wash chamber 106 is sealed shut for washing operation, and a horizontal open position for loading and unloading of articles from the dishwasher. Upper and lower guide rails 124, 126 are mounted on tub side walls 128 and accommodate upper and lower roller-equipped racks 130, 132, respectively. Each of the upper and lower racks 130, 132 is fabricated into lattice structures including a plurality of elongate members 134, and each rack 130, 132 is adapted for movement between an extended loading position (not shown) in which the rack is substantially positioned outside the wash chamber 106, and a retracted position (shown in FIG. 1) in which the rack is located inside the wash chamber 106. A silverware basket (not shown) may be removably attached to the lower rack 132 for placement of silverware, utensils, and the like, that are too small to be accommodated by the upper and lower racks 130, 132.

The dishwasher 100 further includes a lower spray-arm-assembly 144 that is rotatably mounted within a lower region 146 of the wash chamber 106 and above a tub sump portion 142 so as to rotate in relatively close proximity to the lower rack 132. A mid-level spray-arm assembly 148 is located in an upper region of the wash chamber 106 and may be located in close proximity to upper rack 130. Additionally, an upper spray arm assembly (not shown) may be located above the upper rack 130.

The lower and mid-level spray-arm assemblies 144, 148 and the upper spray arm assembly are fed by a fluid circulation assembly for circulating water and dishwasher fluid in the tub 104. The fluid circulation assembly may be located in a machinery compartment 140 located below the bottom sump portion 142 of the tub 104, as generally recognized in the art. Each spray-arm assembly includes an arrangement of discharge ports or orifices for directing washing liquid onto dishes or other articles located in the upper and lower racks 130, 132, respectively. The arrangement of the discharge ports in at least the lower spray-arm assembly 144 provides a rotational force by virtue of washing fluid flowing through the discharge ports. The resultant rotation of the lower spray-arm assembly 144 provides coverage of dishes and other dishwasher contents with a washing spray.

The dishwasher 100 is further equipped with a controller 137 to regulate operation of the dishwasher 100. The controller may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor.

The controller 137 may be positioned in a variety of locations throughout dishwasher 100. In the illustrated embodiment, the controller 137 may be located within a control panel area of door 120 as shown. In such an embodiment, input/output ("I/O") signals may be routed between the control system and various operational components of dishwasher 100 along wiring harnesses that may be routed through the bottom 122 of door 120. Typically, the controller 137 includes a user interface panel 136 through which a user may select various operational features and modes and monitor progress of the dishwasher 100. In one embodiment, the user interface 136 may represent a general purpose I/O ("GPIO") device or functional block. In one embodiment, the user interface 136 may include input components, such as one or more of a variety of electrical, mechanical or electro-mechanical input devices including rotary dials, push buttons, and touch pads. The user interface 136 may include a display component, such as a digital or analog display device designed to provide operational feedback to a user. The user interface 136 may be in communication with the controller 137 via one or more signal lines or shared communication busses.

It should be appreciated that the invention is not limited to any particular style, model, or other configuration of dishwasher, and that the embodiment depicted in FIG. 1 is for illustrative purposes only. For example, instead of the racks 130, 132 depicted in FIG. 1, the dishwasher 100 may be of a known configuration that utilizes drawers that pull out from the cabinet and are accessible from the top for loading and unloading of articles.

Figure 2:
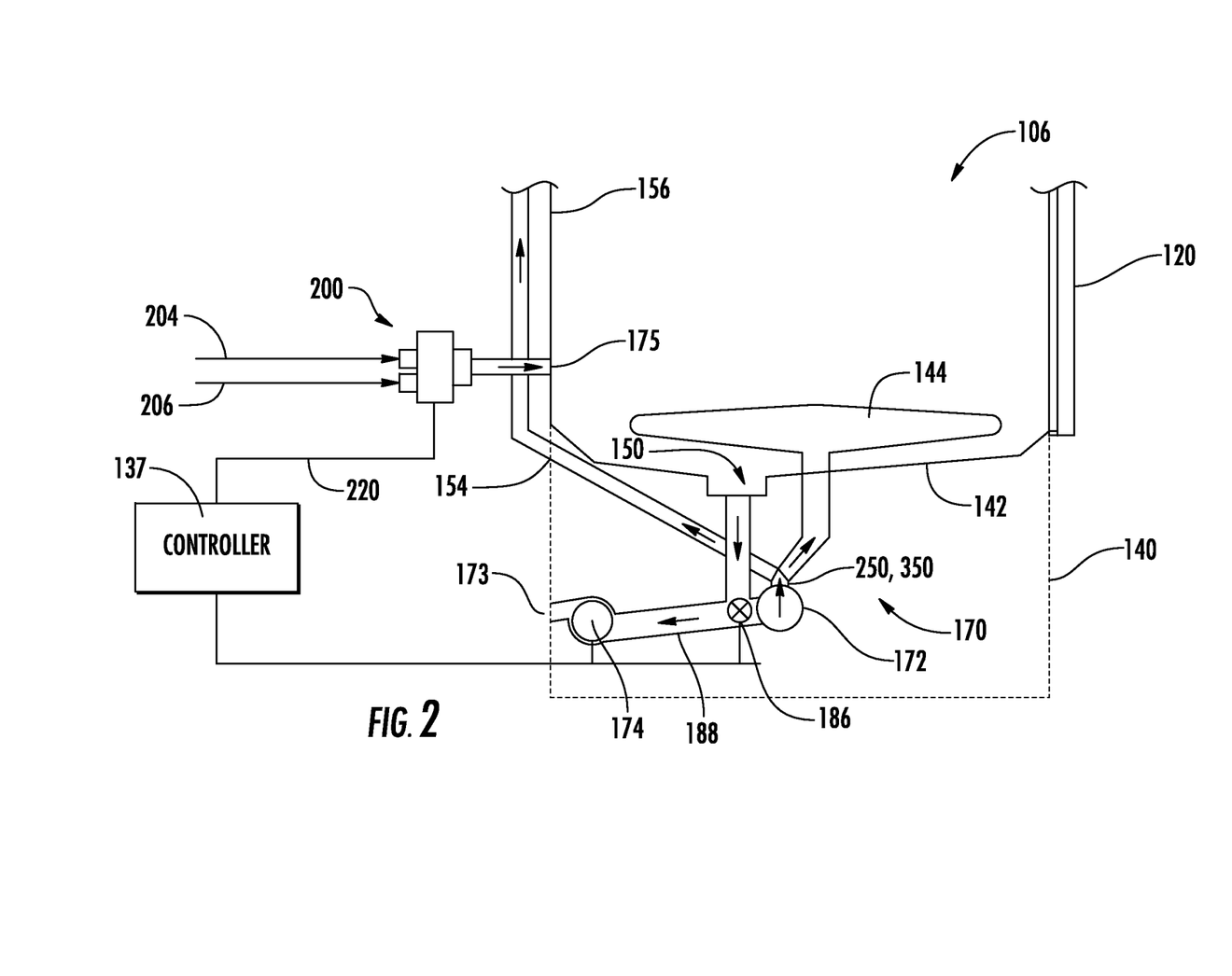
FIG. 2 is a schematic view of one possible fluid system the dishwasher of FIG. 1.

FIG. 2 schematically illustrates an embodiment of a fluid circulation assembly 170 configured below the wash chamber 106. Although one embodiment of a fluid circulation assembly that is operable to perform in accordance with aspects of the disclosure is shown, it is contemplated that other fluid circulation assembly configurations may similarly be utilized without departing from the spirit and scope of the invention. The fluid circulation assembly 170 includes a circulation pump assembly 172 and a drain pump assembly 174, both in fluid communication with the sump 150. Additionally, the drain pump assembly 174 is in fluid communication with an external drain 173 to discharge used wash liquid. Further, the circulation pump assembly 172 is in fluid communication with lower spray arm assembly 144 and conduit 154 which extends to a back wall 156 of wash chamber 106, and upward along the back wall 156 for feeding wash liquid to the mid-level spray arm assembly 148 (FIG. 1) and the upper spray arm assembly. A diverter valve 250, 350 is located between circulation pump assembly output and the conduits to the different spray arm assemblies 144 and 148 and diverts flow one way or the other, as described below. This configuration also applies to a drawer-type of dishwasher, as mentioned above.

As wash liquid is pumped through either the lower spray arm assembly 144 or the mid-level spray arm assembly 148 and the upper spray arm assembly (not shown), washing sprays are generated in the wash chamber 106, and wash liquid collects in the sump 150. The sump 150 may include a cover to prevent larger objects from entering the sump 150, such as a piece of silverware or another dishwasher item that is dropped beneath lower rack 132. A coarse filter and a fine filter (not shown) may be located adjacent the sump 150 to filter wash liquid for sediment and particles of predetermined sizes before flowing into the sump 150. Furthermore, a turbidity sensor may be coupled to the sump 150 and used to sense a level of sediment in the sump 150 and to initiate a sump purge cycle where the contents or a fractional volume of the contents of the sump 150 are discharged when a turbidity level in the sump 150 approaches a predetermined threshold. The sump 150 is filled with water through an inlet port 175 which outlets into wash chamber 106.

As shown, a drain valve 186 is established in flow communication with the sump 150 and opens or closes flow communication between the sump 150 and a drain pump inlet 188. The drain pump assembly 174 is in flow communication with the drain pump inlet 188 and may include an electric motor for pumping fluid at the inlet 188 to an external drain system via drain 173. In one embodiment, when the drain pump is energized, a negative pressure is created in the drain pump inlet 188 and the drain valve 186 is opened, allowing fluid in the sump 150 to flow into the fluid pump inlet 188 and be discharged from fluid circulation assembly 170 via the external drain 173. Alternatively, pump assemblies 172 and 174 may be connected directly to the side or the bottom of sump 150, and the pump assemblies may each include their own valving replacing drain valve 186. Other fluid circulation systems are possible as well, drawings fluid from sump 150 and providing as desired within wash chamber 106 or draining out of washing machine 100.

Referring to FIG. 2, a water supply 200 may be configured with the inlet port 175 for supplying wash liquid to the wash chamber 106. The water supply 200 may provide hot water only, cold water only, or either selectively as desired. As depicted, water supply 200 has a hot water inlet 204 that receives hot water from an external source, such as a hot water heater and a cold water input 206 that receives cold water from an external source. It should be understood that the term "water supply" is used herein to encompass any manner or combination of valves, lines or tubing, housing, and the like, and may simply comprise a conventional hot or cold water connection.

Figure 3:
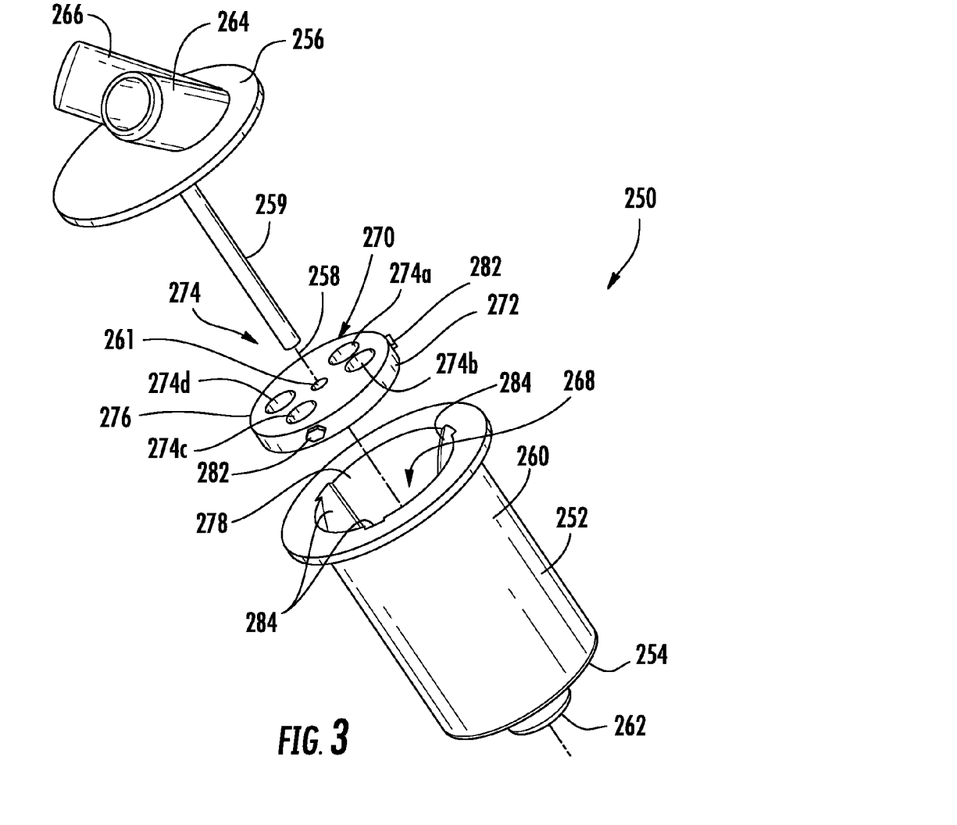
FIG. 3 provides an exploded perspective view of one example of a diverter valve according to certain aspects of the disclosure.

FIG. 3 shows one example of a diverter valve according to certain aspects of the disclosure that could be used dishwasher 100 to alternate flow in various ways between spray arms 144 and 148. As shown, valve 250 includes a housing 252 defining a base wall 254, an upper wall 256, a central axis 258 extending between the base wall and the upper wall, and a side wall 260 connecting the base wall and the upper wall spaced from the central axis. An inlet opening 262 extends through base wall 254. A first outlet opening 264 and a second outlet opening 266 extend through upper wall 256. First outlet opening 264 can be connected to one of the spray arms 144 or 148 and second outlet opening 266 can be connected to the other.

Base wall 254, upper wall 256 and side wall 260 defining a housing interior 268 in which a valve member 270 is located. Housing 252 is operable (via gravity) in a configuration with base wall 254 arranged vertically beneath upper wall 256. Valve member 270 located is coaxially along axis 258 of axle 259 in housing interior 268.

As shown, valve member 270 is disc-shaped plate 272 with an opening 261 for axle 259, and has at least one flow path 274 extending axially therethough defined by at least one opening 274*a-d*. However, valve member 270 could have other axially symmetrical or non symmetrical shapes. For example, valve member 270 could have a non-planar surface shape such as a cone with spiraled surface etchings, or could have a stepped upper surface, or could have a non-circular outer periphery. Therefore, no limitation as to the shape of valve member is implied by the disclosure herein of a disc-shaped element. Valve member 270 is in place to provide a selective flow path upon repeated initiations of flow, regardless of the configuration of the valve member.

Valve member 270 as shown includes a flow path including four openings (274*a-d*), as discussed below. An exterior edge 276 of valve member 270 and an interior surface 278 of side wall 260 have a cooperating cam follower structure 280 defining a cyclic path. As shown, structure 280 includes protrusions 282 on disc edge 276 and a channel like cyclic path 284 on side wall 260, although this could be reversed placing the protrusions on the wall and the channel on the disc.

Path 284 has at least two no flow positions (see positions C and G in FIG. 4) in which valve member 270 is spaced from upper wall 256 (see FIGS. 4 and 5), and at least two flow positions (see Fig. E) in which the flow path in the disc 272 selectively allows communication with one or both of the first and second outlet openings 264, 266 (see FIGS. 4, 7 and 9-11). In other words, as water flow into inlet 262 is cycled on and off, disc 272 will be buoyed upward by flow or allowed to fall when flow stops. Each time that disc 272 moves up or down it advances one position along the flow path. By non-symmetrically staggering the path (see arrows A and B in FIG. 4), upon falling flow protrusions 282 of disc 272 are moved forward (arrow B) to the next portion of the path, rotating disc 272 around central axis 258 rather than simply returning (arrow A).

Figure 4:
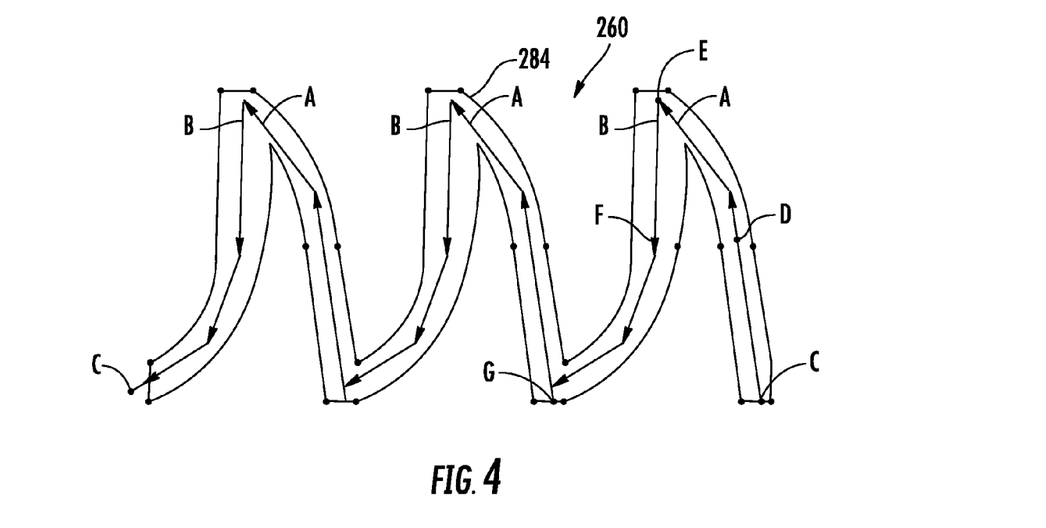
FIG. 4 provides a view of a repeating diverter valve path within a valve housing.
Figures 5, 6, 7, 8:
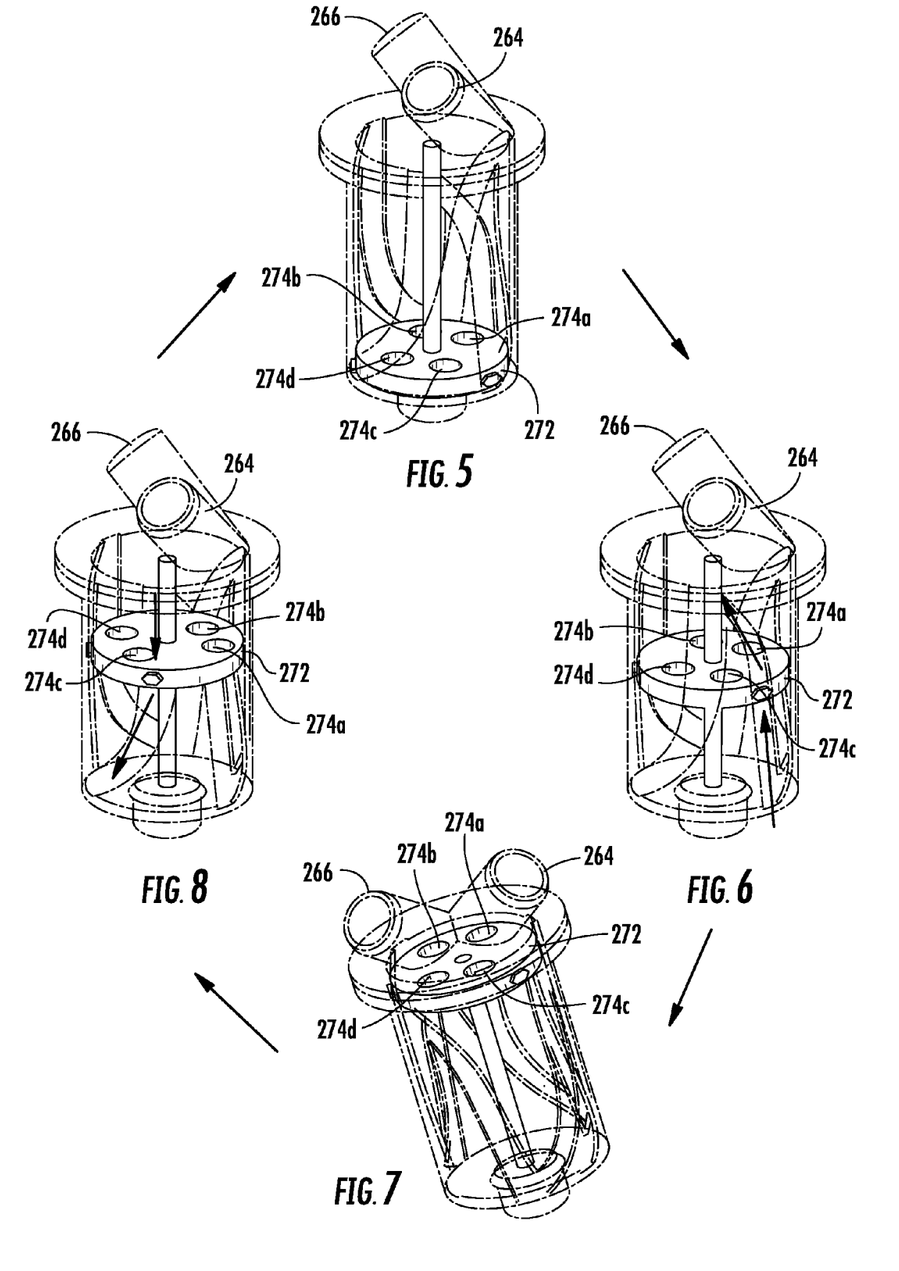
FIG. 5 provides a perspective view of a valve in a no flow position.
FIG. 6 provides a perspective view of the valve as flow starts.
FIG. 7 provides a perspective view of the valve in a first flow position.
FIG. 8 provides a perspective view of the valve in as flow is stopping.

Cyclic path 284 is therefore arranged so that on successive liquid flows into the inlet opening 262, valve member 270 cycles between the at least two flow positions to selectively direct flow out of one or both of the first and second outlet openings and therefore one or both of the spray arms 144 and 148. This motion is all driven simply by the water flow. In FIG. 4, position C corresponds to FIG. 5, D to FIG. 6, E to FIG. 7, F to FIG. 8, and G to FIG. 5 but with disc 120 rotated 120 degrees. When disc 272 is held against plate 256 by water pressure, the opening 264 or 266 not faced by an opening 274 in disc 272 is blocked by the disc. If desired, a seal structure can be provided around the openings 264 and 266 to assist in such sealing.

Path 284 can be defined in several ways, and disc 272 can be constructed in several ways to achieve different functions and alternations of spray arm function. As shown in the example, disc 272 has a flow path defined by four openings 274*a-d*. Path 284 repeats at 120 degrees around side wall 260. Therefore, every fourth water-on cycle the movement of disc 272 fully repeats.

Figure 9:
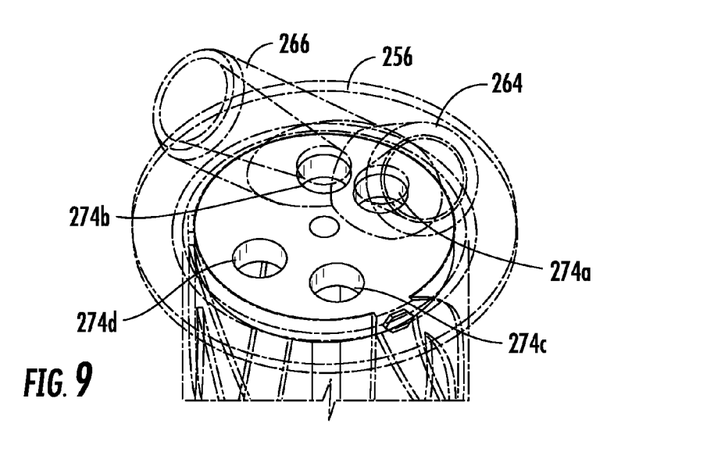
FIG. 9 provides a perspective view of a top of the valve in a dual flow position.
Figure 10:
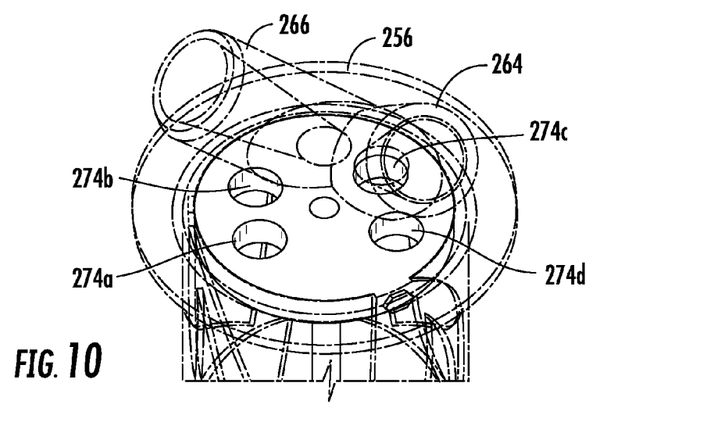
FIG. 10 provides a perspective view of a top of the valve in first single flow position.
Figure 11:
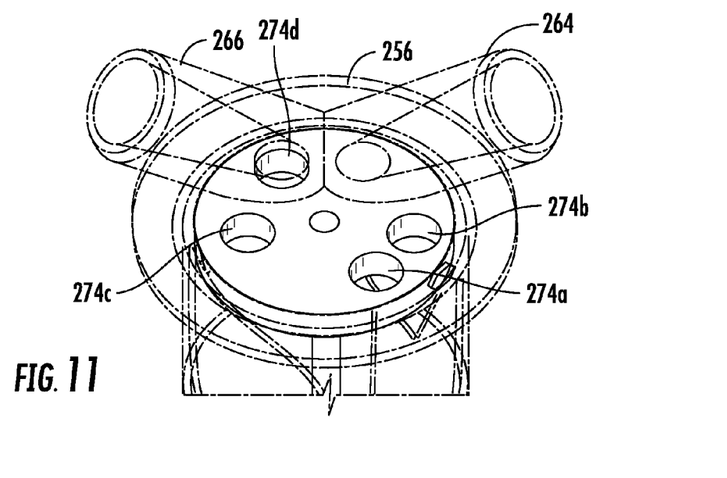
FIG. 11 provides a perspective view of a top of the valve in second single flow position.

As shown in the position of FIG. 9, both outlet openings 264, 266 receive flow via openings 274a and 274b. Openings 274a and b are spaced similarly to openings 264 and 266. In FIG. 10, only first outlet opening 264 receives flow via opening 274d. In FIG. 11, only second outlet opening 266 receives flow via opening 274c. In the next cycle after FIG. 11, disc 272 would return to the position of FIG. 9 and the cycle would repeat.

Therefore, it could be said that cyclic path 284 includes at least three flow positions and at least three no flow positions, the at least three flow positions arranged so that on successive liquid flows into inlet opening 262 the flow path 274 is positioned to direct flow alternatingly through first outlet opening 264, second outlet opening 266, and both openings. As shown, for such function, flow path 274 through valve member 270 includes four openings 274a-d arranged in two pairs (274a and b; 274 c and d), wherein each of the three flow positions is located 120 degrees apart from the other two flow positions relative to central axis 258. Also, openings 274a and b direct flow to first and second outlet openings 264,266 simultaneously, and openings 274c or d respectively direct flow to one of the first or second outlet openings while the other of the first or second outlet openings is blocked.

Figure 12:
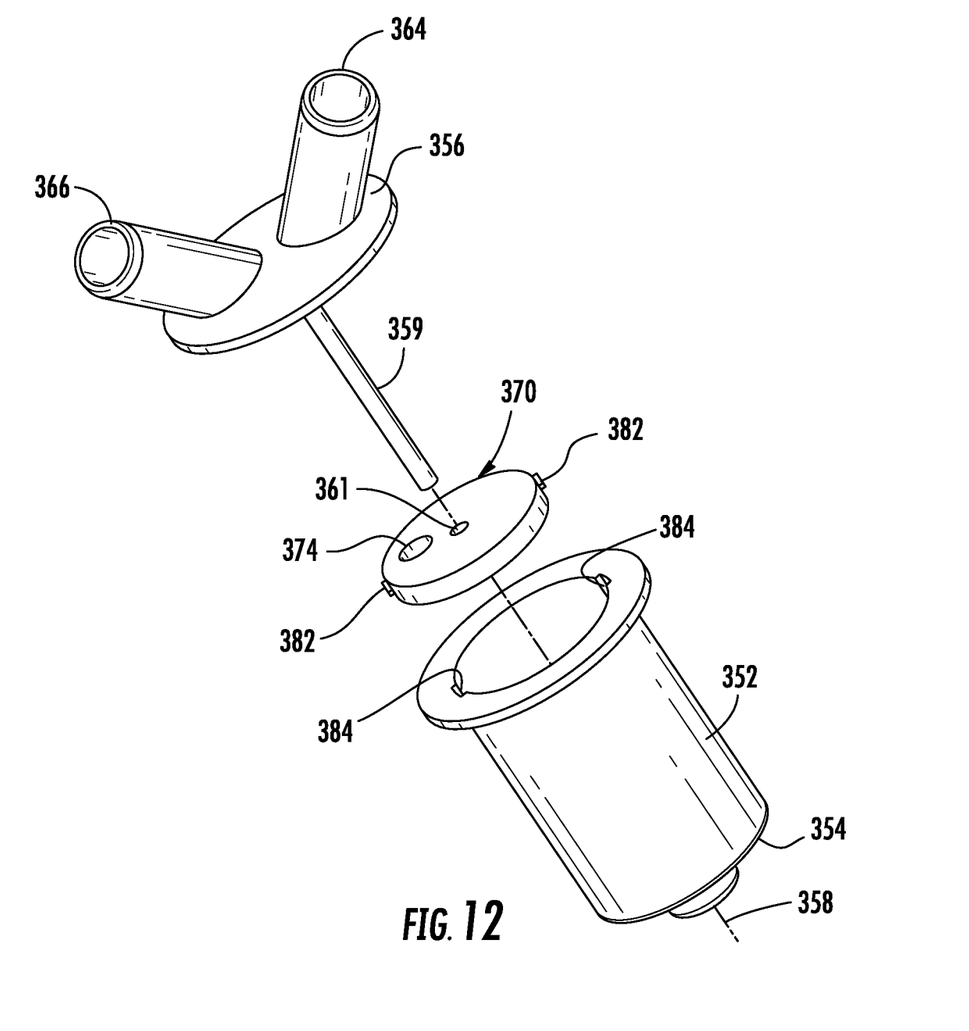
FIG. 12 provides an exploded perspective view of another example of a diverter valve according to certain aspects of the disclosure.
Figure 13:
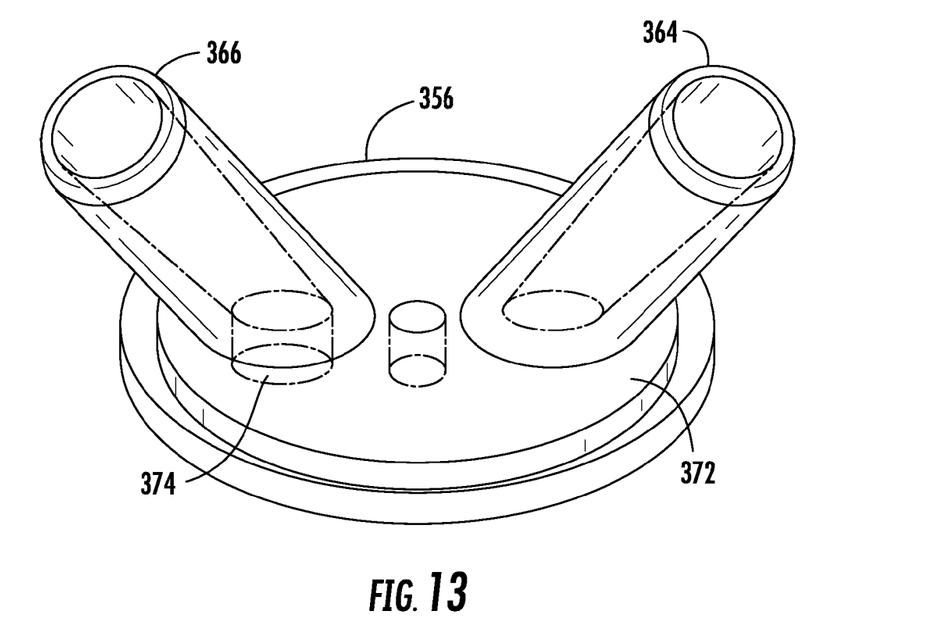
FIG. 13 provides a perspective view of a top of the second valve in first single flow position.
Figure 14:
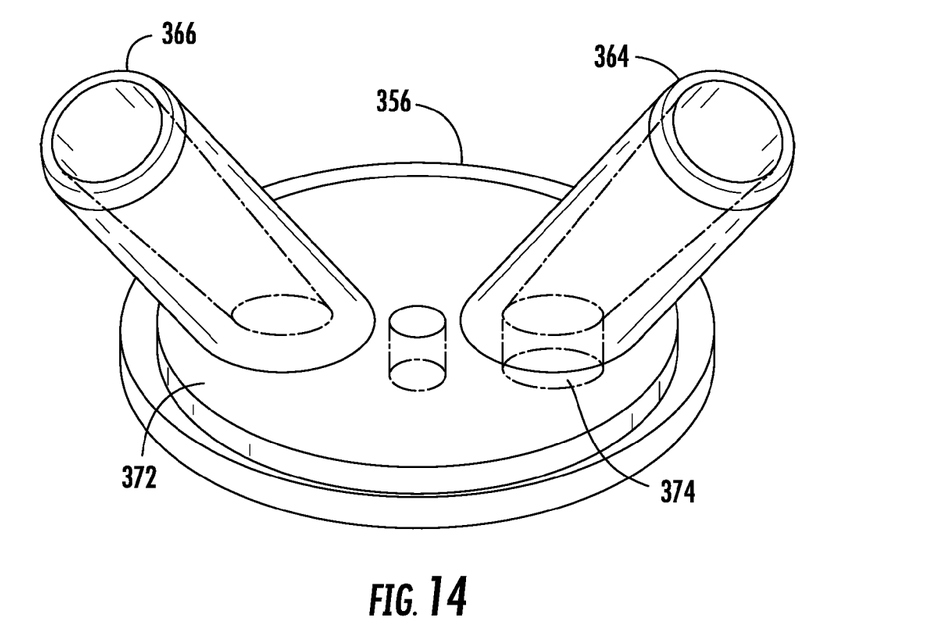
FIG. 14 provides a perspective view of a top of the second valve in first single flow position.

An alternate modified two-way valve 350 design is shown in FIGS. 12-14, wherein flow positions are 180 degrees apart about axis 358. In such design, flow alternates though outlets 364 and 366, without a third dual flow position. Therefore, flow alternates between first and second spray arms 144 and 148 without having a flow function through both. As shown, in FIG. 13, in one flow position opening 374 is aligned with outlet 364 and in the other flow position opening 372 is aligned with outlet 366. Therefore cyclic path 384 is arranged so that on successive liquid flows into the inlet opening 362 the flow path 374 is positioned to direct flow alternatingly through only one of the first or second outlet openings 364 or 366.

It is possible to modify the above valves in various ways. The number, orientations and arrangements of openings and repeats in flow paths could be altered. Repeats could occur at 180, 120, 90, 72, 60, etc., degrees if desired. Various number of openings through a disc are possible and various numbers of outlets as well. Thus different switching, alternating or multiple flow scenarios are possible for one skilled in the art to devise in light of the above. All such constructions are deemed within the scope of the present invention as defined by the attached claims, and no limitation should be construed simply to the two embodiments shown herein.

Parts of valve members may be plastic, metal, rubber, etc. if desired, but should have a density and weight chosen in view of the desired flow needed for the spray devices used so that that the valve member reliably moves upward and seals when flow occurs. Accordingly, valves provide inexpensive and reliable diverters. No electronics are required, and all moving parts are essentially self-actuated by the circulation pump assembly. Mounting valves at or near the circulation pump, beneath the sump, etc., allows a lesser amount of water to have to be cycled through the system and the different spray elements within the wash chamber to achieve a given desired cycle. No ball-driven water column is needed, saving water and complexity. Such valve device can be used not only within a dishwasher but also within other devices.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gravity and flow operated diverter valve for diverting liquid flow from one source to either of two output destinations, the valve comprising:

a housing defining a base wall, an upper wall, a central axis extending between the base wall and the upper wall, a side wall connecting the base wall and the upper wall spaced from the central axis, an inlet opening through the base wall, a first outlet opening and a second outlet opening through the upper wall, the base wall, upper wall and side wall defining a housing interior therein, the housing operable in a configuration with the base wall arranged vertically beneath the upper wall; and a valve member located coaxially in the housing interior, the valve member having at least one flow path extending axially therethough, an exterior edge of the valve member and an interior surface of the side wall having a cooperating cam follower structure defining a cyclic path such that the valve member is vertically movable within the housing interior on the cyclic path, the path having at least two no flow positions in which the valve member is spaced from the upper wall, and at least two flow positions in which the flow path in the valve member selectively allows communication with one or both of the first and second outlet openings, the cyclic path arranged so that on successive liquid flows into the inlet opening the valve member cycles between the at least two flow positions to selectively direct flow out of one or both of the first and second outlet openings.

2. The valve of claim 1, wherein the cyclic path is arranged so that on successive liquid flows into the inlet opening the flow path is positioned to direct flow alternatingly through only one of the first or second outlet openings.

3. The valve of claim 2, wherein the flow pails though the valve member includes one opening, and wherein the at least two flow positions include first and second flow positions located 180 degrees apart radially relative to the central axis.

4. The valve of claim 1, wherein the cyclic path includes at least three flow positions and at least three no flow positions, the at least three flow positions arranged so that on successive liquid flows into the inlet opening the flow path is positioned to direct flow alternatingly through the first outlet opening, the second outlet opening and both the first and second outlet openings.

5. The valve of claim 4, wherein the flow path through the valve member includes four openings arranged in two pairs, and wherein each of the three flow positions is located 120 degrees apart from the other two flow positions relative to the central axis.

6. The valve of claim 5, wherein the two openings in one of the pairs of openings direct flow to the first and second outlet openings simultaneously and the each of the openings in the other of the two pairs of openings respectively directs flow to one of the first or second outlet openings while the other of the first or second outlet openings is blocked.

7. The valve of claim 1, wherein the valve member is disc-shaped.

8. A dishwasher comprising: a cabinet; a wash chamber within the cabinet; a first spray device for spraying liquid into the wash chamber; a second spray device for spraying liquid into the wash chamber; a circulation pump assembly for pumping water from a sump area of wash chamber to either the first spray device or the second spray device; and a valve including a housing defining a base wall, an upper wall, a central axis extending between the base wall and the upper wall, a side wall connecting the base wall and the upper wall spaced from the central axis, an inlet opening through the base wall, a first outlet opening and a second outlet opening through the upper wall, the base wall, upper wall and side wall defining a housing interior therein, the housing operable in a configuration with the base wall arranged vertically beneath the upper wall; and a valve member located coaxially in the housing interior, the valve member having at least one flow path extending axially therethough, an exterior edge of the valve member and an interior surface of the side wall having a cooperating cam follower structure defining a cyclic path, the path having at least two no flow positions in which the valve member is spaced from the upper wall, and at least two flow positions in which the flow path in the valve member selectively allows communication with one or both of the first and second outlet openings, the cyclic path arranged so that on successive liquid flows into the inlet opening the valve member cycles between the at least two flow positions to selectively direct flow out of one or both of the first and second outlet openings, the cyclic path also arranged so that the valve member rises within the housing interior when liquid flows into the inlet opening.

9. The dishwasher of claim 8, wherein the cyclic path is arranged so that on successive liquid flows into the inlet opening the flow path is positioned to direct flow alternatingly through only one of the first or second outlet openings.

10. The dishwasher of claim 9, wherein the flow path though the valve member includes one opening, and wherein the at least two flow positions include first and second flow positions located 80 degrees apart radially relative to the central axis.

11. The dishwasher of claim 8, wherein the cyclic path includes at least three flow positions and at least three no flow positions, the at least three flow positions arranged so that on successive liquid flows into the inlet opening the flow path is positioned to direct flow alternatingly through the first outlet opening, the second outlet opening and both the first and second outlet openings.

12. The dishwasher of claim 11, wherein the flow path through the valve member includes four openings arranged in two pairs, and wherein each of the three flow positions is located 120 degrees apart from the other two flow positions relative to the central axis.

13. The dishwasher of claim 12, wherein the two openings in one of the pairs of openings direct flow to the first and second outlet openings simultaneously and the each of the openings in the other of the two pairs of openings respectively directs flow to one of the first or second outlet openings while the other of the first or second outlet openings is blocked.

14. The dishwasher of claim 8, wherein the valve member is disc-shaped.

* * * * *